Aug. 12, 1941.  G. P. LINDHOLM  2,252,680
PRESSURE INDICATOR FOR TIRES
Filed Sept. 11, 1939
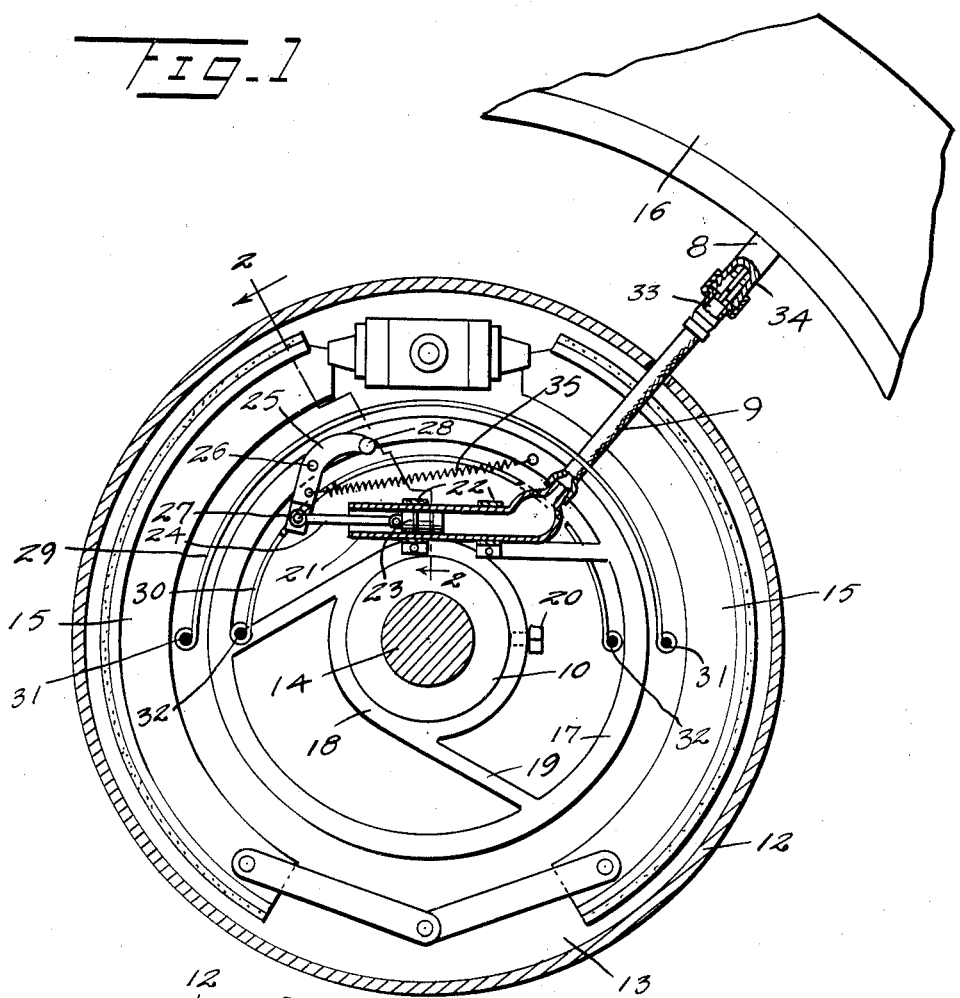
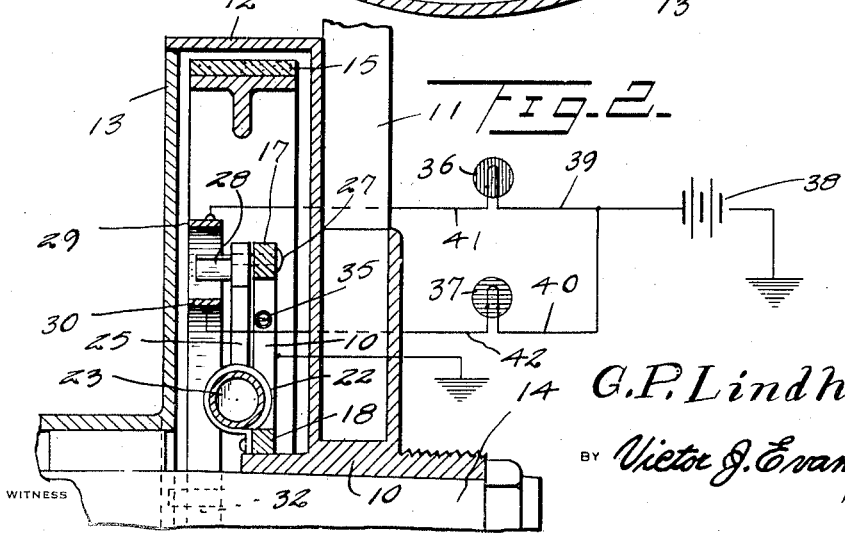
G. P. Lindholm
INVENTOR
BY Victor J. Evans & Co.
ATTORNEYS Patented Aug. 12, 1941

2,252,680

UNITED STATES PATENT OFFICE 2,252,680

PRESSURE INDICATOR FOR TIRES

George P. Lindholm, Minden, Nebr.

Application September 11, 1939, Serial No. 294,358

1 Claim. (Cl. 200—58)

This invention relates to pressure indicators for tires and has for an object to provide a device adapted to be installed on the wheels of automobiles, trailers, or trucks to warn the driver when the air pressure in the tires is becoming dangerously low or dangerously high.

A further object is to provide a device of this character which may be easily installed on the wheels of used motor vehicles as well as on wheels during the course of manufacture, and which will embody essentially a pressure responsive switch lever adapted to selectively engage one of a pair of half circular switch contact bars connected with a current supply and connected with a respective warning lamp on the instrument board, to indicate a dangerous air pressure condition within each one of the tires.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a longitudinal sectional view of a motor vehicle wheel equipped with pressure warning apparatus constructed in accordance with the invention.

Figure 2 is a cross sectional view taken on the line 2—2 of Figure 1 and showing diagrammatically the electrical connections.

Referring now to the drawing in which like characters of reference designate similar parts in the various views, 10 designates a wheel hub, 11 the spokes, 12 the brake drum, 13 the stationary backing plate of the drum, 14 the vehicle axle, 15 the brake shoes, and 16 the tire, of a conventional motor vehicle wheel.

In carrying out the invention a supporting frame is secured to the hub and comprises an outer ring 17, an inner ring 18 concentric with the outer ring, and tangentially disposed spokes 19 connecting the outer ring with the inner ring. The inner ring is secured to the wheel hub 10 by a set screw 20.

A piston cylinder 21 is secured to the inner ring and to one of the spokes by a pair of resilient ring clamps 22. The cylinder thus rotates with the wheel. The cylinder receives a piston 23 having a piston rod 24 which projects through the open end of the cylinder.

An arcuate switch lever 25 is pivoted intermediate its ends to the outer ring 17 by a pivot pin 26, and one end of the lever is pivotally connected to the end of the piston rod by a pivot pin 27. The other end of the lever is equipped with a laterally disposed extension 28, best shown in Figure 2.

A pair of concentrically disposed spaced semicircular switch contacts 29 and 30 are disposed stationary in nested position on opposite sides of the path of the projection 28. The contacts are fixed to the stationary backing plate 13 by respective insulating posts 31 and 32.

A tube 9 connects the cylinder 21 with the inflating valve 8 of the tire 16. The tube 9 is provided with a valve 33 which normally holds open the valve 34 of the inflating tube of the tire so that air pressure of the tire is exerted through the tube 9 against the piston 23 in the cylinder 21.

A helical spring 35 is connected at one end to the arcuate lever 25 adjacent the pivot pin 27 of the piston rod and is connected at the other end to the outer ring 17. Normally the tension of this spring is such that when 35 pounds of air pressure exist in the tire, the piston will hold the lever 25 in such position of its pivotal movement that the projection 28 will be out of contact with either of the switch contacts 29 and 30. When the tire pressure falls below 35 pounds the piston 23 will move inward and rock the lever 25 so that the projection 28 makes contact with thet outer switch contact 29. When the excessive tire pressure exists in the tire the piston will be moved outward and will rock the projection 28 into engagement with the inner switch contact 30, as best shown in Figure 2.

A pair of distinctly colored bulbs 36 and 37 are disposed on the intrument board of the vehicle within view of the driver. One terminal of each bulb is connected with a source of electricity, such as the positive terminal of the battery 38, by respective wires 39 and 40. The other terminal of one of the bulbs is connected to the outer switch contact 29 by a wire 41. The other terminal of the other bulb is connected to the inner switch contact 30 by a wire 42. One negative terminal of the battery and the frame bar 17 are grounded.

In operation, should dangerously low tire pressure exist in a tire the projection 28 of the lever 25 will have wiping engagement with the stationary outer switch contact 29 and close the circuit of the respective signal bulb 36 which may, for example, be colored red to cause this bulb to glow during one half revolution of the wheel and to be extinguished during the other half revolution thus affording ample warning to the driver of dangerously low tire pressure.

Should the tire pressure build up excessively the lever 25 will be rocked to dispose the projection 28 in wiping engagement with the inner stationary switch contact 30 so that the circuit to the respective bulb 37, which may be colored blue, will be closed and during each half revolution of the wheel the bulb will glow and give ample warning to the driver of dangerously high tire pressure in the tire.

From the above description it is thought that the construction and operation of the invention will be fully understood without further explanation.

What is claimed is:

In a pressure indicator for tires, the combination with a motor vehicle wheel hub, brake drum backing plate and tire, of a tire pressure responsive circuit closer comprising a supporting frame secured to the hub to rotate as a unit therewith, a cylinder secured to the frame, a tube connecting the cylinder with the tire, a piston in the cylinder responsive to tire pressure, an arcuate switch lever pivoted intermediate its ends on said frame and pivotally connected at one end to the piston, a laterally disposed extension on the other end of the lever forming a movable switch contact, a pair of concentrically disposed semi-circular fixed switch contacts spaced laterally from the brake drum backing plate and from each other to form an unobstructed channel between the contacts on opposite sides of said movable switch contact, insulating posts securing the fixed switch contacts at the ends to the backing plate, and a helical spring connected at one end to said switch lever and at the other end to said frame and normally holding said movable switch contact to move in a path between the fixed switch contacts when the tire pressure is normal, said movable switch contact having wiping engagement with said fixed switch contacts selectively when predetermined high tire pressure or predetermined low tire pressure moves the piston to rock the switch lever on its pivot.

GEORGE P. LINDHOLM.